United States Patent [19]

Sakamoto et al.

[11] 4,275,413
[45] Jun. 23, 1981

[54] LINEAR INTERPOLATOR FOR COLOR CORRECTION

[76] Inventors: Takashi Sakamoto, 25-1 Akesawa-Cho, Nishino Yamashina-ku, Kyoto-shi; Akira Itooka, 26 Kamiyanagi-cho, Hirano Kita-ku, Kyoto-shi, both of Japan

[21] Appl. No.: 54,402

[22] Filed: Jul. 3, 1979

Related U.S. Application Data

[63] Continuation-in-part of Ser. No. 891,536, Mar. 30, 1978.

[51] Int. Cl.$^3$ ............................................. G03F 3/08
[52] U.S. Cl. ................................................... 358/80
[58] Field of Search ................................. 358/80, 22

[56] References Cited

U.S. PATENT DOCUMENTS

| | | | |
|---|---|---|---|
| 3,875,587 | 4/1975 | Pugsley | 358/80 |
| 3,893,166 | 7/1975 | Pugsley | 358/80 |

*Primary Examiner*—John C. Martin
*Attorney, Agent, or Firm*—Lackenbach, Lilling & Siegel

[57] ABSTRACT

A linear interpolating method and apparatus for color signals in a memory of a picture reproducing machine, wherein the stored signals are addressed in a three-dimensional fashion and a cubic interpolation unit in the memory is dissected into tetrahedra. It is determined which of these tetrahedra contains the interpolation point, and then the value at that point is interpolated from the known values at the vertices of the tetrahedron, using a certain method of linear interpolation. An apparatus is described for carrying out the method.

11 Claims, 13 Drawing Figures

LINEAR INTERPOLATOR FOR COLOR CORRECTION

CROSS REFERENCE TO RELATED APPLICATION

This application is a continuation-in-part of U.S. patent application Ser. No. 891,536, filed Mar. 30, 1978.

BACKGROUND OF THE INVENTION

This invention relates to a linear interpolating method for signals in a memory which is used for color correction of picture signals in a reproducing machine such as a color scanner, a color facsimile producer, or the like, in which color separation picture images are produced by photo-electric scanning, and the apparatus to carry out the method.

In conventional color photographic plate making, color correction is often made by photographic masking. However, this method has many defects, for example: limitations of color correction ability, necessity for many skilled engineers, unreliable results of the color separation, irregular quality of finish, complexity, and the like.

In order to overcome these defects, a color correction masking method by an electronic color separation machine such as a color scanner has been developed and is nowadays more popular. Most of the color scanners now used employ an analog computer system for the color correction calculations so as to increase the calculation speed.

This method, however, has also defects such as the difficulty of the introduction of many kinds of calculations because of the restriction of calculation ability, inevitable effects of temperature drift and noise, multiplicity of operational amplifiers and so forth as electric elements, inconvenience of operation due to many adjustments of potentiometers and switches, and high manufacturing cost.

If the analog computer system is simply replaced with a digital computer system, which has advantages such as a wide correction variable range and convenience of operation, the calculation speed for the color correction decreases very much, and the processing ability is reduced. Accordingly, this system is not practicable.

Recently, a direct scanner has been developed for plate making in printing, which performs color separation, color correction, conversion of scale of the reproduced image, and halftone processing at the same time so as to meet the requirement for high quality printing and rapid operation. In this case, however, there is the defect that supplementary masking or hand retouching after the color separation cannot be applied, as opposed to conventional color scanning which includes color separation, color correction, conversion of scale of the reproduction images, and halftone processing.

In general, an original color picture is scanned by a color scanner to obtain three (red, green, and blue) color separation signals. These three color separation signals are set to a color operation circuit, thereby finally obtaining recording signals for density of printing inks, such as cyan, magenta, yellow, and black.

In order to provide the most accurate possible color reproduction, a combination of the amounts of cyan, magenta, and yellow inks (the black ink, and so forth, are omitted for the sake of brevity of explanation) is necessarily determined corresponding to a combination of red, green, and blue color separation signals.

Consequently, for the purpose of color correction by selecting the combination of cyan, magenta, and yellow values corresponding to the combination of red, green, and blue values, the color-corrected combinations of cyan, magenta, and yellow values corresponding to each combination of red, green, and blue values are stored in a memory in advance, and then the color-corrected combination of cyan, magenta, and yellow values is read out by addressing the memory by the combination of red, green, and blue values corresponding thereto.

If each red, green, and blue range is divided into, for example, two hundred tone steps, altogether $200^3 = 8,000,000$ combinations of cyan, magenta, and yellow values must be stored in the memory, which requires that the memory have a large capacity. This means high cost, and thus is not practicable.

Therefore, in order to reduce the storage capacity required for the memory, each color range of red, green, and blue is divided into, for example, sixteen tone steps, and then $16^3 = 4096$ combinations of cyan, magenta, and yellow values are required. Thus the storage capacity requirement for the memory is reduced to a manageable level. On the other hand, the tone steps become too rough, and the lack of output consistency becomes conspicuous, so that printing quality suffers. Therefore, in this case, it is necessary to interpolate intermediate values properly between each two tone steps.

The present invention relates to an improved method of interpolation in the three-dimensional space defined in the memory by the three axes of red, green, and blue. In order that the method may be better understood, some explanation of prior art methods of interpolation will now be given.

Referring to FIG. 1, there is shown an example of interpolation of a function U of two variables, where the interval to be interpolated over is taken as unity.

The value $U(x,y)$, i.e., $U(x_1+x_f, y_i+y_f)$ at a point P in an interpolation region ABCD will be found by a mathematical interpolating method, in which $x_i$ and $y_i$ are the intergral parts of x and y and $x_f$ and $y_f$ are the decimal parts.

For interpolation it is necessary that the function at the vertices A, B, C, and D should have known values $U(x_i,y_i)$, $U(x_i+1,y_i)$, $U(x_i+1,y_i+1)$, and $U(x_i,y_i+1)$. The interpolated value $U(x,y)$ will be a function of $X_f$, $Y_f$, $U(x_i,Y_i)$, $U(x_i+1,y_i)$, $U(x_i+1,y_i+1)$, and $U(x_i, y_i+1)$. Further, for consistency, the interpolated value should be consistent with the known values of the original function at the corners of the unit region.

An interpolating method satisfying such a condition will be described. It is called linear interpolation because on the edges of the unit region it reduces to a simple linear interpolation function.

In order to find the value $U(x,y)$ at the point P in the interpolation unit square ABCD, first drawn four perpendiculars from the point P to each side AB, BC, CD, and DA of the square. Designate the ends or feet of these perpendiculars by $Q_1$, $Q_2$, $Q_3$, and $Q_4$ respectively, as shown in FIG. 2, and add up the results obtained by multiplying each known value at the vertices A, B, C, and D by the area of each rectangle opposite to the vertex, thereby obtaining the following equation (I):

$$U(x,y) = U(x_i + x_f, y_i + y_f) = U(x_i, y_i)(1-x_f)(1-y_f) \quad (I)$$
$$+ U(x_i + 1, y_i) x_f (1 - y_f)$$
$$+ U(x_i, y_i + 1)(1 - x_f) y_f$$
$$+ U(x_i + 1, y_i + 1) x_f y_f$$

The interpolating method according to the formula (I) satisfies the above boundary conditions at the corners of the unit square and reduces to linear interpolation along the edges of the unit square, and thus is mathematically reasonable. Further, this method may be applied to the three-dimensional case.

In FIG. 3 there is shown a unit cube interpolation unit having eight vertices with co-ordinates of $(x_i, y_i, z_i)$, $(x_i+1, y_i, z_i)$, $(x_i, y_i+1, z_i)$, $(x_i, y_i, z_i+1)$, $(x_i+1, y_i+1, z_i)$, $(x_i+1, y_i, z_i+1)$, $(x_i, y_i+1, z_i+1)$, and $(x_i+1, y_i+1, z_i+1)$, and including a point P with co-ordinates $(x_i+x_f, y_i+y_f, z_i+z_f)$ at which the value of U is to be interpolated. The cube is divided up into eight rectangular parallelepipeds by three planes which include the point P and are parallel to its faces. The value U(x,y,z) at the point P is found by adding up the values obtained by multiplying each known value at each of the vertices of the unit cube by the volume of each rectangular parallelepipedon which is positioned opposite to that vertex, thereby obtaining the following formula (II):

$$U(x,y,z) = U(x_i + x_f, y_i + y_f, z_i + z_f) = \quad (II)$$
$$U(x_i, y_i, z_i)(1 - x_f)(1 - y_f)(1 - z_f)$$
$$+ U(x_i + 1, y_i, z_i) x_f (1 - y_f)(1 - z_f)$$
$$+ U(x_i, y_i + 1, z_i)(1 - x_f) y_f (1 - z_f)$$
$$+ U(x_i, y_i, z_i + 1)(1 - x_f)(1 - y_f) z_f$$
$$+ U(x_i, y_i + 1, z_i + 1)(1 - x_f) y_f z_f$$
$$+ U(x_i + 1, y_i, z_i + 1) x_f (1 - y_f) z_f$$
$$+ U(x_i + 1, y_i + 1, z_i) x_f y_f (1 - z_f)$$
$$+ U(x_i + 1, y_i + 1, z_i + 1) x_f y_f z_f$$

Again, this method produces consistent results at the verticles of the unit cube. Further, along the edges of the unit cube it reduces to simple linear interpolation, and on the faces of the unit cube it reduces to the method of equation (I). It is further clear that the value obtained in the center of each face of the unit cube is the mean value of the known values at each vertex of that face, and the value obtained at the center of the unit cube is the mean value of the eight known values at the vertices of the cube. Accordingly, this method is seen to be mathematically reasonable.

However, this method has disadvantages. It requires eight products to be formed, each of four values, and addition thereof. Hence it is not always best for high speed calculation.

There is another disadvantage in this method Although from one unit cube to the next the interpolated values are continuous, their derivative is not. That is, the slope of the interpolated values is discontinuous from one unit cube to the next, i.e. the line of the interpolated values bends sharply as we pass over the boundary. Thus in practice a sharp step of color values will be apparent in the finished picture, and the cubic structure of the memory will show, to the detriment of quality. This effect can become quite serious. FIG. 4 shows a distribution of the interpolated values obtained according to the formula (I) which has a saddle form, which clearly shows the aforementioned problem. An even continuous line of interpolated values in the unit square $A_1B_1C_1D_1$ is obtained, and also in the unit square $A_2B_2C_2D_2$, but between these two squares, at their common border, the derivative of the interpolated values is discontinuous.

SUMMARY OF THE INVENTION

Therefore, it is an object of the present invention to provide a linear interpolating method and apparatus for such signals in a memory free from the above-mentioned defects, which enables the memory to quickly calculate interpolation values by using a simple formula, without large discontinuities of the slope of the interpolated values between one interpolation unit and the next.

In order to achieve this object, as well as others which will become apparent hereafter, a linear interpolating method for color signals in a memory in accordance with the present invention comprises the steps of producing color signals (B), (R) and (G) by photoelectrically scanning an original picture. The color separated signals are converted to those of logarithmic values. The logarithmic values signals are then converted to digital signals and these are separated into two sets of four bit address signals, one set of which is an address signal for calling color corrected signals of four bits of the higher order (for R, G and B) and the other set of which is for the lower order bits (for r, g and b). The relative magnitudes of the lower four bit address signals are them compared and an output signal is generated which is a function of said relative magnitudes. The output signals are monitored and it is determined as a function of said relative magnitudes, to which address four bit higher order color corrected signals the quantity one is to be added. Color corrected signals corresponding to all combinations of said four bits in the higher order address signals are preliminarily stored. Four sets of coefficients (1-r, 1-g, 1-b), (r-g, r-b, g-b, g-r, b-r, b-g), (g-b, b-g, b-r, r-b, r-g, g-r) and (b, r, g), from the lower-order four bit signals and four coefficient signals are selected from said four sets of coefficients as a function of said output signals. Each of said coefficients is multiplied by each of the corresponding color corrected signals stored in the memory, and the higher order bits obtained by the multiplication of said signals in the multipliers are added.

The present invention also contemplates an apparatus for utilizing the linear interpoling method, which includes suitable means for performing the above method steps.

The method and apparatus of the present invention are based on a linear interpolating method for color signals in a memory of a picture reproducing machine, the interpolating method being described in the detail description. The method comprises the steps of storing appropriate values of color picture output signals corresponding to certain stepped values of color input signals in the memory addressed in a three-dimensional fashion, and interpolating values of color output signals at points which are between said values by dividing up the cubic interpolating unit of the memory which is contituted by a single step of each of the color input signals into a plurality of tetrahedra whose vertices are either vertices of the cubic unit, centers of its faces, or its center point, calculating the color output signal at each vertex of these tetrahedra which is a center of a face of the cubic unit, if any, by averaging the values of the color output signal at the four vertices which are corners of said face, and at the center point of the cubic unit by averaging the values of the color output signal at all eight of the vertices of the cubic unit, determining which of these tetrahedra includes the interpolation point at which the value of the color output signal is to be interpolated, and deriving the interpolated value at the interpolation point as a weighted sum of the values at the four vertices of the determined tetrahedron, the value at each vertex being given a weight corresponding to the ratio of the volume of a second tetrahedron whose vertices are the interpolation point and the other three vertices of the determined tetrahedron to the volume of the determined tetrahedron.

Variations of this method using dissections into twenty-four, -five, and -six tetrahedra will be explained.

BRIEF DESCRIPTION OF THE DRAWINGS

The present invention will now be described in detail with respect to the accompanying drawings, in which.

The prior art interpolation methods, and their disadvantages, have been explained above. A method and apparatus according to the present invention will now be described.

DESCRIPTION OF THE PREFERRED EMBODIMENTS

Figure 1:
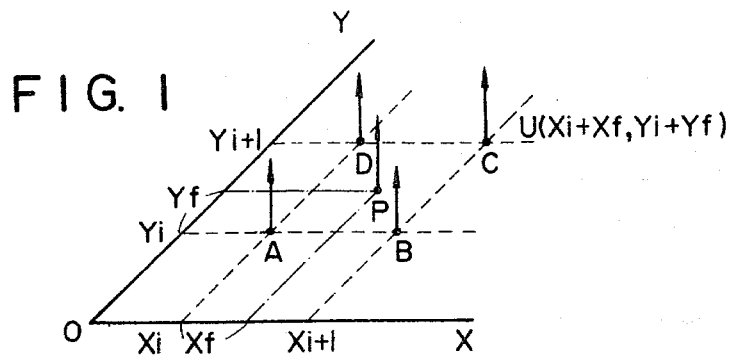
FIG. 1 is a schematic view of a conventional interpolating method over a two-dimensional interpolation unit square.
Figure 2:
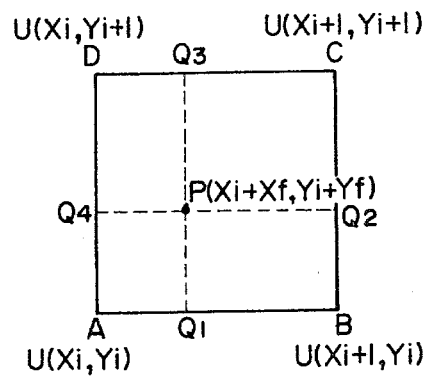
FIGS. 2 and 3 are schematic views of a square interpolation unit region and a cubic interpolation unit region of the conventional two-dimensional and three-dimensional interpolating methods.
Figure 3:
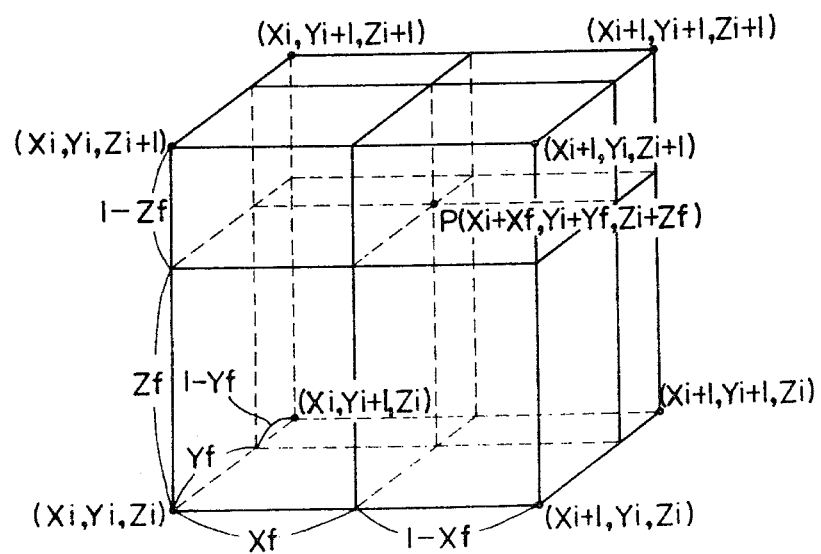
Figure 4:
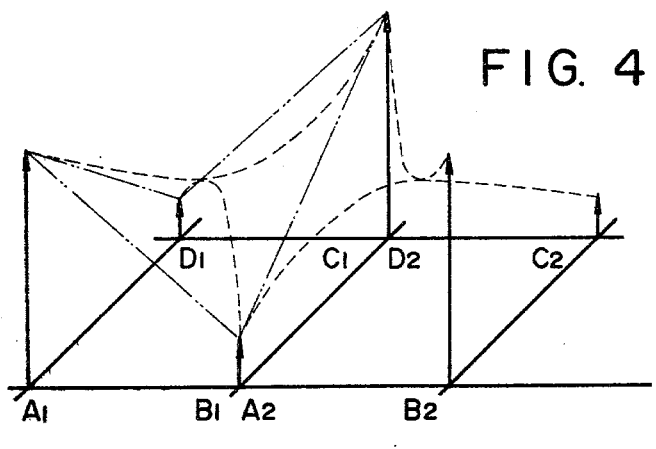
FIG. 4 is a schematic view of a distribution of interpolation values of the conventional method for two-dimensional interpolation.
Figure 5:
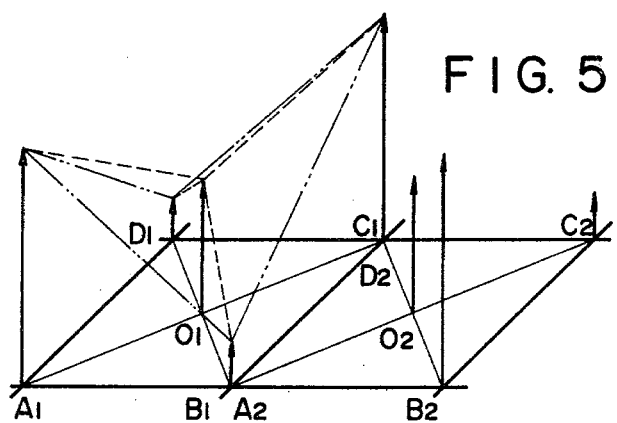
FIG. 5 is a schematic view of an improved two-dimensional interpolating method.

In FIG. 5, showing the two-dimensional case, two adjacent interpolation regions $A_1B_1C_1D_1$ and $A_2B_2C_2D_2$ are shown. The centers of these unit squares are designated by $O_1$ and $O_2$, and interpolated values at these points are derived as averages of the function values at the four corners of the squares. Then interpolation is conducted linearly in each of the triangles $A_1O_1B_1$, $B_1O_1C_1$, $C_1O_1D_1$, $D_1O_1A_1$, $A_2O_2B_2$, $B_2O_2C_2$, $C_2O_2D_2$, and $D_2O_2A_2$. That is, the point at which the value is to be interpolated is first checked to determined which of these triangles it falls into, and then the value at the point is determined by interpolation in the triangle in a fashion and analogous corners of the triangle, and then calculating the value of the function at the point as a weighted sum of the values at the corners of the triangle, giving each value at a corner a weighting of the ratio of the area of a second triangle whose corners are the point and the other two corners of the triangle, and the area of the triangle. In this method the magnitude of the discontinuity in the derivative of the interpolated values from one interpolation region to the next is much reduced.

Figure 6:
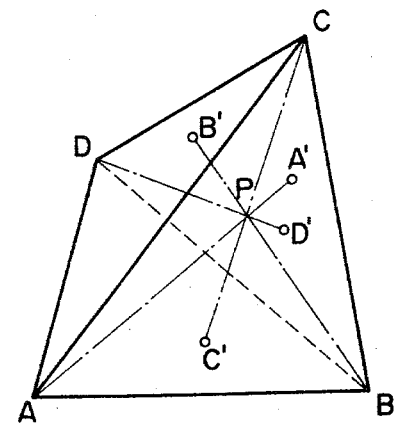
FIG. 6 is a schematic view of a method of three-dimensional interpolation over a tetrahedral region.

Now, considering the three-dimensional case, the basic interpolation method in a tetrahedral volume will be explained with respect to FIG. 6. Let ABCD be a tetrahedron of which each vertex is a point at which the value of the function U to be interpolated is known. The value at point P, internal to the tetrahedron, is calculated as follows: draw lines from each vertex A, B, C, and D through the point P to meet the opposite sides of the tetrahedron in A', B', C', D;40 . Then the interpolated value U(P) is $U(A)$ × ratio of volumes of tetrahedra PBCD and ABCD
+
$U(B)$ × ratio of volumes of tetrahedra PDAC and ABCD
+
$U(C)$ × ratio of volumes of tetrahedra PDAB and ABCD
+
$U(D)$ × ratio of volumes of tetrahedra PABC and ABCD.

Now the ratio of of the volumes of the tetrahedra PBCD and ABCD, for example, is the same as the ratio of the heights of P and of A from the plane of BCD.

Figure 7:
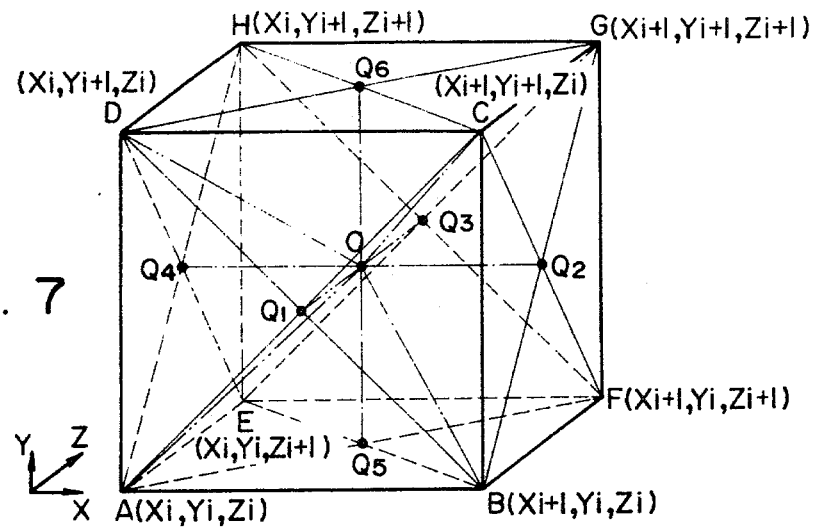
FIG. 7 is a schematic view of a cubic interpolation unit dissected into twenty-four tetrahedra according to one of the variations of the method of the present invention.

Referring to FIG. 7, there is shown a unit cube interpolation volume ABCDEFGH, and the values of the function U of three variables are assumed to be known at the vertices of the cube. All three variations of the present method depend upon dissecting this cube into tetrahedra whose vertices are either vertices of the cube, centers of faces of the cube, or the center of the cube. Then a series of comparisons are made to determine which of these tetrahedra contains the point at which the value of the function is required to be interpolated. Once this is determined, the value is then interpolated within that tetrahedron according to the method described above, using analytical geometry. It will be realised that it is mathematically reasonable to interpolate, initially, the values of the function at centers of faces of the cube as the average of the values at the four corners of the faces, and the value of the function at the center of the cube as the average of the values at all eight vertices of the cube. Thus for each vertex of each tetrahedron of the dissection of FIG. 7 the value of the function is known, and therefore the method illustrated in FIG. 6 can be applied for interpolation.

TABLE 1

| TETRAHEDRAL INTERPOLATION DIVISION | DISCRIMINATION CONDITIONS | | | | | | CALCULATING FACTORS | | | | | | | |
|---|---|---|---|---|---|---|---|---|---|---|---|---|---|---|
| | $X_f-Y_f$ | $Y_f-Z_f$ | $Z_f-X_f$ | $X_f+Y_f-1$ | $Y_f+Z_f-1$ | $Z_f+X_f-1$ | (A) | (B) | (C) | (D) | (E) | (F) | (G) | (H) |
| ABQ₁O | + | + | (−) | (−) | (−) | (−) | $-(X_f+Y_f-1)$ | $(X_f-Y_f)$ | | | | | | |
| BCQ₁O | + | (+) | (−) | + | (−) | (−) | | $(X_f-Y_f)$ | $(X_f+Y_f-1)$ | | | | | |
| CDQ₁O | − | (+) | (−) | + | + | (−) | | | $(X_f+Y_f-1)$ | $-(X_f-Y_f)$ | | | | |
| DAQ₁O | − | + | (−) | (−) | (+) | (−) | $-(X_f+Y_f-1)$ | | | $-(X_f-Y_f)$ | | | | |
| GFQ₂O | (+) | − | − | (−) | + | + | | $-(Y_f+Z_f-1)$ | $(Y_f-Z_f)$ | | | $-(Y_f-Z_f)$ | $(Y_f+Z_f-1)$ | |
| FBQ₂O | (+) | (−) | − | + | + | (+) | | $-(Y_f+Z_f-1)$ | $(Y_f-Z_f)$ | | | $-(Y_f-Z_f)$ | $(Y_f+Z_f-1)$ | |
| BCQ₂O | − | (−) | − | + | (+) | (+) | | | | | | | | |
| CGQ₂O | − | − | (−) | (+) | (+) | + | | | | | | | | |
| GHQ₃O | (+) | + | (−) | (−) | (−) | + | | | | | $-(X_f+Y_f-1)$ | $(X_f-Y_f)$ | $(Y_f+Z_f-1)$ | $-(X_f-Y_f)$ |
| HEQ₃O | (+) | + | − | (+) | (−) | (+) | | | | | $-(X_f+Y_f-1)$ | $(X_f-Y_f)$ | $(X_f+Y_f-1)$ | $-(X_f-Y_f)$ |
| EFQ₃O | + | (+) | − | (+) | (−) | − | | | | | | | | |
| FGQ₃O | + | + | (−) | (−) | (−) | (−) | | | | | | | | |
| ADQ₄O | + | (+) | + | (−) | (+) | − | $-(Y_f+Z_f)$ | | $(Y_f-Z_f)$ | $(Y_f-Z_f)$ | $-(Y_f-Z_f)$ | | | $(Y_f+Z_f-1)$ |
| DHQ₄O | + | (+) | + | (−) | (+) | (−) | $-(Y_f+Z_f-1)$ | | | $(Y_f-Z_f)$ | $-(Y_f-Z_f)$ | | | $(Y_f+Z_f-1)$ |
| HEQ₄O | (+) | + | + | (+) | (+) | (−) | $-(Z_f+X_f-1)$ | | | | $(Z_f-X_f)$ | | | |
| FAQ₄O | (+) | + | + | (+) | (−) | (−) | $-(Z_f+X_f-1)$ | | | | $-(Z_f-X_f)$ | | | |
| AEQ₅O | + | − | (+) | (+) | (−) | (+) | | | | | $(Z_f-X_f)$ | $(Z_f+X_f-1)$ | | |
| EFQ₅O | + | (−) | (+) | (+) | (−) | − | | | | | $(Z_f-X_f)$ | $(Z_f+X_f-1)$ | | |
| FBQ₅O | (+) | (−) | + | + | (+) | − | | $-(Z_f-X_f)$ | $-(Z_f+X_f-1)$ | $-(Z_f+X_f-1)$ | | | | |
| BAQ₅O | + | − | + | (−) | (+) | − | | $-(Z_f-X_f)$ | $-(Z_f+X_f-1)$ | $-(Z_f+X_f-1)$ | | | | |
| CGQ₆O | − | (+) | − | (−) | (−) | + | | | | | | | | |
| CDQ₆O | (−) | + | − | + | (−) | (+) | $-(Z_f+X_f-1)$ | $-(Z_f-X_f)$ | $-(Z_f-X_f)$ | $-(Z_f+X_f-1)$ | | | $(Z_f+X_f-1)$ | $(Z_f-X_f)$ |
| DHQ₆O | (−) | + | (−) | + | + | (+) | $-(Z_f+X_f-1)$ | | | $-(Z_f+X_f-1)$ | | | $(Z_f+X_f-1)$ | $(Z_f-X_f)$ |
| HGQ₆O | − | (+) | (−) | (+) | + | + | | | | | | | | |

| TETRAHEDRAL INTERPOLATION DIVISION | DISCRIMINATION CONDITIONS | | | | | | CALCULATING FACTORS | | | | | | |
|---|---|---|---|---|---|---|---|---|---|---|---|---|---|
| | $X_f-Y_f$ | $Y_f-Z_f$ | $Z_f-X_f$ | $X_f+Y_f-1$ | $Y_f+Z_f-1$ | $Z_f+X_f-1$ | (Q₁) | (Q₂) | (Q₃) | (Q₄) | (Q₅) | (Q₆) | (O) |
| ABQ₁O | + | + | (−) | (−) | (−) | (−) | | | | | | | $2Z_f$ |
| BCQ₁O | + | (+) | (−) | + | (−) | (−) | | | | | | | $2Z_f$ |
| CDQ₁O | − | (+) | (−) | + | + | (−) | | | | | | | $2Z_f$ |
| DAQ₁O | − | + | (−) | (−) | (+) | (−) | | | | | | | $2Z_f$ |
| GFQ₂O | (+) | − | − | (−) | + | + | $2(Y_f-Z_f)$ | | | | | | $2(1-X_f)$ |
| FBQ₂O | (+) | (−) | − | + | + | (+) | $-2(Z_f+X_f-1)$ | $-2(Z_f-X_f)$ | | | | | $2(1-X_f)$ |
| BCQ₂O | − | (−) | − | + | (+) | (+) | $2(Y_f+Z_f-1)$ | $2(X_f+Y_f-1)$ | | | | | $2(1-X_f)$ |
| CGQ₂O | − | − | (−) | (+) | (+) | + | $-2(Z_f-X_f)$ | $2(Z_f+X_f-1)$ | | | | | $2(1-X_f)$ |
| GHQ₃O | (+) | + | (−) | (−) | (−) | + | | $2(X_f-Y_f)$ | | | | | $2(1-Z_f)$ |
| HEQ₃O | (+) | + | − | (+) | (−) | (+) | | | $-2(Y_f-Z_f)$ | | | | $2(1-Z_f)$ |
| EFQ₃O | + | (+) | − | (+) | (−) | − | | | $2(Z_f+Y_f-1)$ | | | | $2(1-Z_f)$ |
| FGQ₃O | + | + | (−) | (−) | (−) | (−) | | | $2(Y_f+Z_f-1)$ | | | | $2(1-Z_f)$ |
| ADQ₄O | + | (+) | + | (−) | (+) | − | | | $2(X_f-Y_f)$ | | | | $2(1-Z_f)$ |
| DHQ₄O | + | (+) | + | (−) | (+) | (−) | | | | $2(Z_f-X_f-1)$ | | | $2X_f$ |
| HEQ₄O | (+) | + | + | (+) | (+) | (−) | | | | $-2(Y_f+X_f-1)$ | | | $2X_f$ |
| FAQ₄O | (+) | + | + | (+) | (−) | (−) | | | | $-2(Z_f+X_f-1)$ | | | $2X_f$ |
| AEQ₅O | + | − | (+) | (+) | (−) | (+) | | | | $-2(X_f-Y_f)$ | | | $2X_f$ |
| EFQ₅O | + | (−) | (+) | (+) | (−) | − | | | | | $2(X_f-Y_f)$ | | $2Y_f$ |
| FBQ₅O | (+) | (−) | + | + | (+) | − | | | | | $-2(Y_f+Z_f-1)$ | | $2Y_f$ |
| BAQ₅O | + | − | + | (−) | (+) | − | | | | | $-2(X_f+Y_f-1)$ | | $2Y_f$ |
| CGQ₆O | − | (+) | − | (−) | (−) | + | | | | | $-2(Y_f-Z_f)$ | | $2Y_f$ |
| CDQ₆O | (−) | + | − | + | (−) | (+) | | | | | | $-2(X_f-Y_f)$ | $2(1-Y_f)$ |
| DHQ₆O | (−) | + | (−) | + | + | (+) | | | | | | $2(Y_f+Z_f-1)$ | $2(1-Y_f)$ |
| HGQ₆O | − | (+) | (−) | (+) | + | + | | | | | | $2(X_f+Y_f-1)$ | $2(1-Y_f)$ |
| | | | | | | | | | | | | $2(Y_f-X_f-1)$ | $2(1-Y_f)$ |

Figure 8:
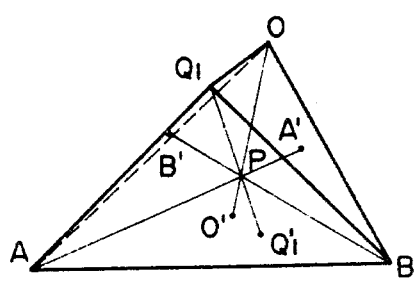
FIG. 8 is a schematic view of one of the tetrahedra of the dissection of FIG. 7.

In the dissection of FIG. 7 there exist twenty-four tetrahedra, of each of which one vertex is the center of the cubic unit, two vertices are vertices of the cubic unit which are connected by an edge of the cubic unit, and the fourth vertex is the center of a square face of the cubic unit one edge of which face is the said edge of the cubic unit. The twenty-four tetrahedra are all isomorphic. One of them is shown in FIG. 8. The centers of the faces of the cubic unit have been labelled as $Q_1 \ldots Q_6$, and the center of the cube as O. The tetrahedron $OABQ_1$ is illustrated. The planes OAB, $Q_1AB$, $OQ_1B$, and $OQ_1A$ have the equations $y_f - z_f = 0$, $z_f = 0$, $x_f + y_f - 1 = 0$, and $x_f - y_f = 0$ respectively. Therefore it is clear that the condition for the point P to lie inside the tetrahedron $OABQ_1$ is that $y_f - z_f \geq 0$, $x_f + y_f - 1 \leq 0$, and $x_f - y_f \geq 0$. (Of course $z_f \geq 0$, by definition). Provided these conditions are all satisfied, the interpolated value of the function may be calculated as outlined above. Thus U(P) is equal to $$(A) \times \text{ratio of volumes of } POQ_1B \text{ and } OABQ_1 \quad \text{(III)}$$
$$+$$
$$U(B) \times \text{ratio of volumes of } POQ_1A \text{ and } OABQ_1$$
$$+$$
$$U(Q_1) \times \text{ratio of volumes of } POAB \text{ and } OABQ_1$$
$$+$$
$$U(O) \times \text{ratio of volumes of } PQ_1AB \text{ and } OABQ_1$$
$$= U(A)[1 - x_f - y_f] + U(B)[x_f - y_f]$$
$$+ U(Q_1)[2(y_f - z_f)] + U(O)[2z_f]$$

This is because the ratio of the volumes of the above-mentioned tetrahedra, as pointed out above, is the same as the ratio of their heights, and the equations of their faces are as stated above.

Similar results hold when the point P is in the the conditions for discrimination of which tetrahedron contains the point P, and of the factors which are used for calculation of the interpolated value in each case, is shown as Table 1. Using this table, by testing the conditions that are not parenthesized, it is possible to characterise the tetrahedron which contains the point P, and accordingly it is not necessary to test the parenthesized conditions.

It is readily understood that the calculation is far simpler in practice than the method of the abovementioned formula (II). Further, in this method, the discontinuities across the borders between one unit cube and the next are much reduced, since the values near the face of the unit cube are much more dominated by the values at the four corners of the face than in the prior art method of (II).

Figure 9:
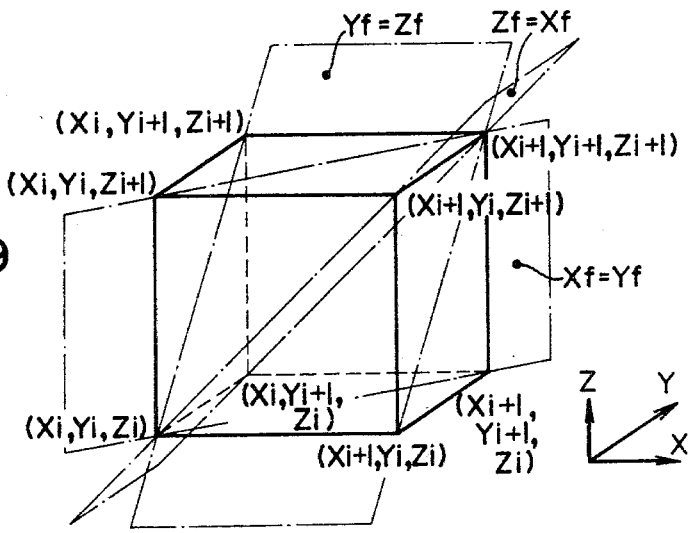
FIG. 9 is a schematic view of another variation of the method of the present invention, wherein the unit cube is dissected into six tetrahedra.

In fact the color picture output signals in the memory commonly vary monotonically, and therefore a more simple and coarse method of interpolation than the one outlined above may well be satisfactory in a particular case. Therefore the method of FIGS. 9 and 10 may well be acceptable, although it is not quite so accurate as the method of formula (III). In FIG. 9 is shown a dissection of the unit cube into tetrahedra all of whose vertices are vertices of the unit cube. Thus this method has the advantage that no averaging of values at the vertices of the unit cube is necessary in order to determine values at the centers of the faces of the unit cube and at its center.

Figure 10:
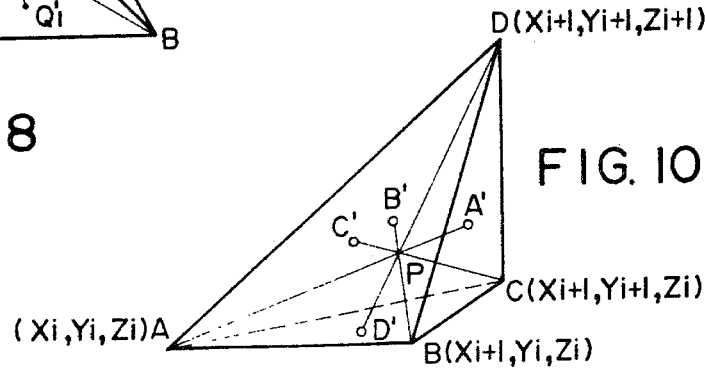
FIG. 10 is a schematic view of one of the tetrahedra obtained by the dissection of FIG. 9.

The unit cube is dissected into six tetrahedra by three planes which have a line in common which is the long diagonal of the unit cube, and each plane is inclined to the other two at 60° and contains two edges and four vertices of the unit cube. A typical one of the six tetrahedra is illustrated in FIG. 10. In this case the conditions for the point P to lie within this tetrahedron are that $x_f \geq y_f \geq z_f$, as can be easily worked out using solid geometry, as before. In the same way the interpolated value U(P) is equal to $$U(A)[1 - x_f] + U(B)[x_f - y_f] + U(C)[y_f - z_f] + U(D)z_f.$$

Similar discriminating conditions and calculating factors can be worked out for the other five tetrahedra. Table 2 shows the complete set. It is readily appreciated that this variation of the method is easier in calculation than the method of formula (III), albeit at a slight loss in accuracy.

Figure 11:
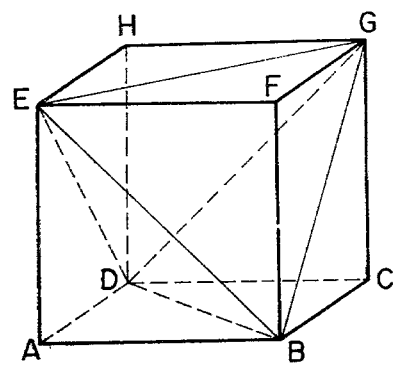
FIGS. 11 and 12 illustrate another method of dissecting the unit cube into five tetrahedra, which gives another variation of the method of the present invention.
Figure 11:
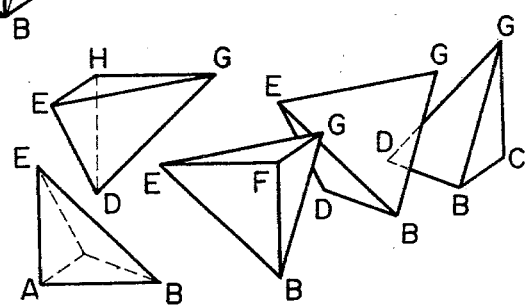
Figure 12:
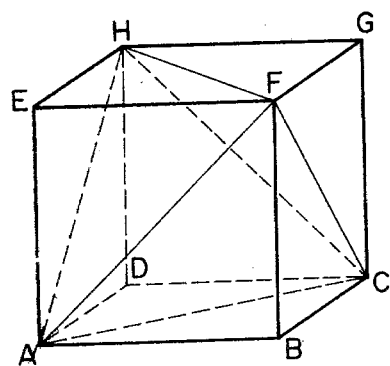
Figure 12:
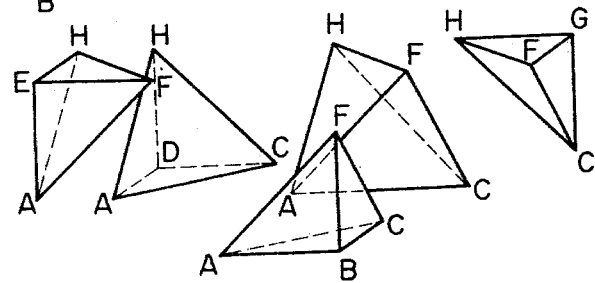

In FIGS. 11 and 12 there is shown another method for dissecting the unit cube into tetrahedra, which this time are five in number. The unit cube is divided up by four planes, each of which contains exactly three vertices of the cube, and which are characterized by intersecting one another along lines which are diagonals of faces of the cube. Thus there are two possible dissections which are mirror images of one another, and these are shown in the figures. Exploded diagrams also show how the tetrahedra fit together. In this variation it will be noted that the tetrahedra are not all isomorphic; one is different from the others. As before, it is determined using discrimination conditions derived from solid geometry in which of these tetrahedra the interpolation point lies, and then, using calculation factors derived in the same way as above, the interpolated value is calculated. It will be obvious to anyone skilled in the art, depending upon the foregoing disclosure, how to calculate these discrimination conditions and calculation factors, and therefore listing of them will be omitted for the sake of brevity of explanation.

In the methods which use the dissections into six and into five tetrahedra, which are explained above with reference to FIGS. 9, 10, 11, and 12, in face that interpolated values at the center of the faces of the unit cube, and at its center, will be different slightly from those derived by simple averaging which were used in the first version of the method, illustrated in FIG. 7. However, this variation will only be slight in the case of monotonic functions, and is quite tolerable.

Figure 13:
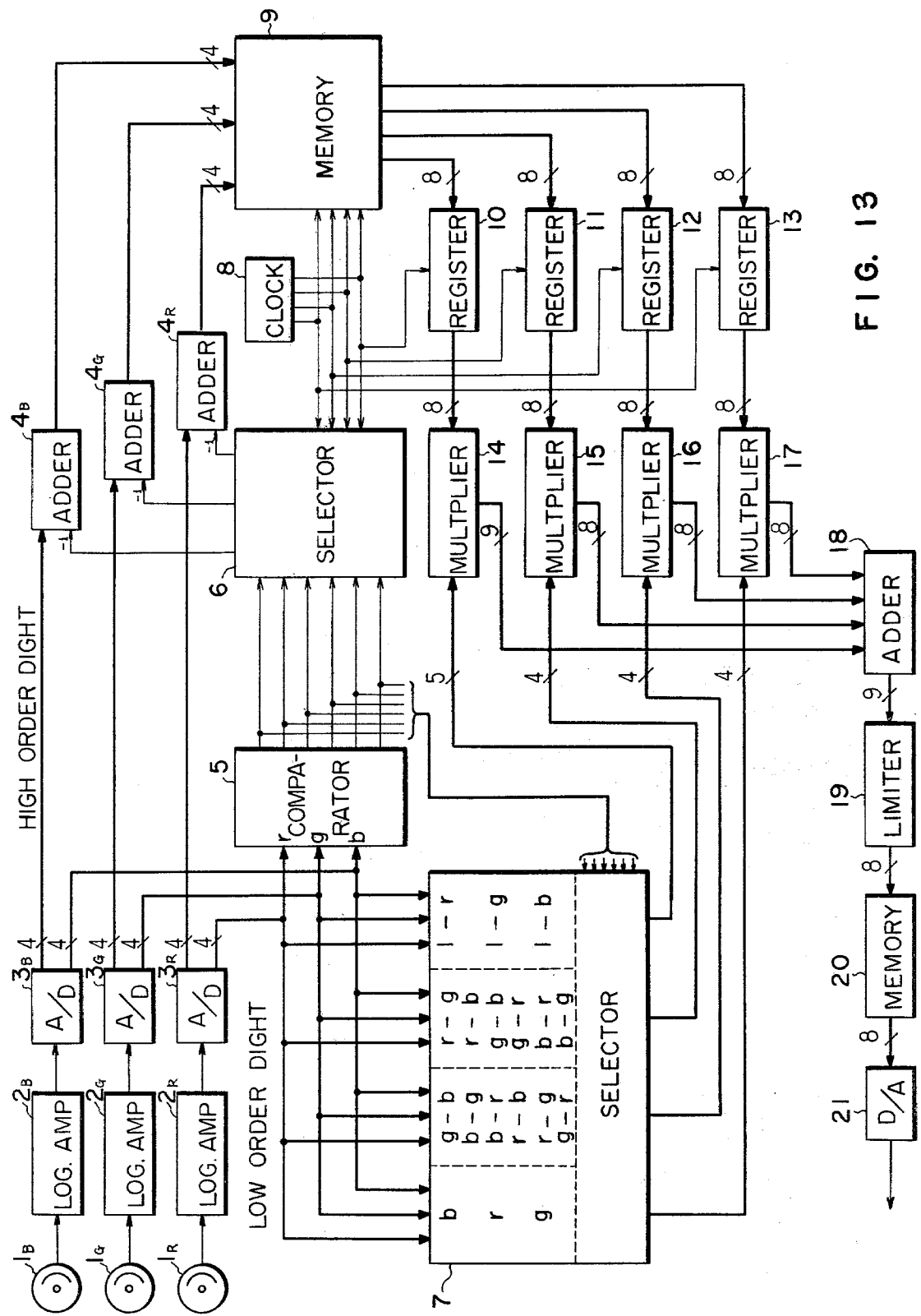
FIG. 13 shows a block diagram of an example of a color scanner utilizing a signal interpolating method shown in FIGS. 10 and 12 according to the present invention.

Referring to FIG. 13, a circuit in accordance with the present invention will now be described.

TABLE 2

| DISCRIMINATION CONDITIONS | CALCULATING FACTORS | | | |
|---|---|---|---|---|
| | $U(X_i \cdot Y_i \cdot Z_i)$ | $U(X_i + 1 Y_i \cdot Z_i)$ | $U(X_i \cdot Y_i + 1 \cdot Z_i)$ | $U(X_i \cdot Y_i \cdot Z_i + 1)$ |
| $X_f \geq Y_f \geq Z_f$ | $1 - X_f$ | $X_f - Y_f$ | | |
| $X_f \geq Z_f > Y_f$ | $1 - X_f$ | $X_f - Z_f$ | | |
| $Z_f > X_f \geq Y_f$ | $1 - Z_f$ | | $Z_f - X_f$ | |
| $Z_f \geq Y_f > X_f$ | $1 - Z_f$ | | $Z_f - Y_f$ | |
| $Y_f > Z_f \geq X_f$ | $1 - Y_f$ | | | $Y_f - Z_f$ |
| $Y_f > X_f > Z_f$ | $1 - Y_f$ | | | $Y_f - X_f$ |

TABLE 2-continued

| DISCRIMINATION CONDITIONS | CALCULATING FACTORS | | | |
|---|---|---|---|---|
| | $U(X_i + 1 Y_i + 1 Z_i)$ | $U(X_i + 1 Y_i \cdot Z_i + 1)$ | $U(X_i \cdot Y_i + 1 \cdot Z_i + 1)$ | $U(X_i + 1 Y_i + 1 \cdot Z_i + 1)$ |
| $X_f \geqq Y_f \geqq Z_f$ | $Y_f - Z_f$ | | | $Z_f$ |
| $X_f \geqq Z_f > Y_f$ | | $Z_f - Y_f$ | | $Y_f$ |
| $Z_f > X_f \geqq Y_f$ | | $X_f - Y_f$ | | $Y_f$ |
| $Z_f \geqq Y_f > X_f$ | | | $Y_f - X_f$ | $X_f$ |
| $Y_f > Z_f \geqq X_f$ | | | $Z_f - X_f$ | $X_f$ |
| $Y_f > X_f > Z_f$ | $X_f - Z_f$ | | | $Z_f$ |

Reference numerals (1$_B$), (1$_G$) and (1$_R$) are photomultipliers. The photomultiplier (1$_B$) produces a color separated signal B (blue), the photomultiplier (1$_G$) produces other color separated signal G (green) and the photomultiplier (1$_R$) produces the remaining color separated signal ( (red). Each of those color separated signals is produced by electrically scanning an original color picture, respectively. Each of those color separated signals obtained is fed to another of the analog-digital converters (3$_B$), (3$_G$), and (3$_R$), respectively, through each of the logarithmic amplifiers (2$_B$), (2$_G$), and (2$_R$) to result in analog-digital convertion therein.

In each of the analog-digital converters (3$_B$), (3$_G$) and (3$_R$), each of the 8 bit signals is divided respectively into high order 4 bit (B, G, R) signals (shown in FIG. 13 as high order digit) and lower order 4 bit signals (b, g, r) by each of the analog-digital converters (3$_B$, 3$_G$ and 3$_R$). Each of the high order 4 bit signals is fed to the adders (4$_B$), (4$_G$) and (4$_R$), respectively.

Each of the lower order 4 bit signals is fed to a comparator (5) for comparing magnitude of the signals of b (blue), g (green) and r (red).

Any one signal which meets the magnitude requirement on comparison is fed to a selector (6) and a coefficient selector (7). In the selector (6) the input signal is accessed four times by a read timing clock (8). Determination as to which of the high order 4 bit signals of B, G and R "1" should be added depends on the output signal coming from the comparator (5). Each of the outputs of the selector (6) is input to the respective adders (4$_B$), (4$_G$) and (4$_R$).

Respective adders (4$_B$), (4$_G$) and (4$_R$) are connected to a memory (9) in which all the color corrected signals corresponding to each of all combinations of said high order 4 bits signals are preliminarily stored. The memory (9) is connected with four registers (10), (11), (12) and (13) with data lines. These registers (10), (11), (12) and (13) are arranged to store color corrected signals which are accessed according to clock signals from the read timing clock (8).

Each of these registers is connected to respective multipliers (14), (15), (16) and (17). To the multiplier (14) 5 bits signal (coefficient signal) in a special case (described hereinafter in detail) is input from the selector (7), and to other multipliers (15), (16) and (17) respective 4 bits signals (coefficients) from the selector (7) are to be input.

In the respective multiplier (10), (11), (12) and (13) each of these (coefficient) signals is multiplied by the color corrected signals stored in the registers (10), (11), (12) and (13), and those results are added in an adder (18) to which signals from a detail emphasizing circuit (not shown) are also added.

Output signals from the adder (18) are stored in a memory (20) through a limiter (19), and the contents of the memory (20) are read out by controlling the access timing therefor and then they are fed to a digital-analog converter (21) to generate the final analog output signals.

The operation of the color scanner utilizing the present invention will now be described. At first, the three primary color separation signals, i.e., B (blue), G (green) and R (red), are obtained by photoelectrically scanning an original color picture. These color separation signals are converted to logarithmic values by the logarithmic amplifiers (2$_B$), (2$_G$) and (2$_R$), and those logarithmic values are further converted to digital signals by each of the analog-digital converters (3$_B$), (3$_G$) and (3$_R$). In this case without utilizing the interpolating method, if color corrected signals are to be prepared for every combination of 256 gradations (8 bits) for each of these colors, R, G and B individually a memory having capacity of $2^8 \times 2^8 \times 2^8 = 16 \times 8$ mega (bit) is needed. Therefore, the cost of the memory becomes too expensive and further, it is not practical because too much time is taken to calculate and store each of the color corrected signals individually so as to correspond to respective combinations which are preliminarily prepared for.

In the example shown in FIG. 13, each of the digital signals is divided into an address signal for accessing each of the color corrected signals of the high order 4 bits (B, G, R) and the lower order 4 bits signals (b, g, r) in the respective analog-digital converters (3$_B$), (3$_G$) and (3$_R$). With respect to all combinations of the high order 4 bit signals ($2^4 \times 2^4 \times 2^4 = 4096$), each of the color corrected signals is previously prepared therefor. In this case capacity of the memory (9) may be 4K $\times$ 8 bits, so that one-four thousandth (1/4000) of that of the abovementioned can be saved. At this time, for finer combinations, including the lower order 4 bit (b, g, r) address signals, color corrected signals are partially prepared, i.e., very insufficiently, so that additional color corrected signals are generated by the following interpolating method to be used for compensating therefor.

Signals of the lower order 4 bits are fed to the comparator (5), wherein relations in magnitude among those of (b, g, r) are compared. Six cases can be anticipated in the resultant comparisons, and any one output signal is entered into the coefficient selector (7) and the selector (6).

In the selector (6), any one signal entered is accessed four times by the read timing clock (8), and depending on the output signal from the comparator (5), the decision as to which high order 4 bit signals B, G and R "1" should be added is made. In other words, at the first time, irrespective of magnitude among the signals of b, g and r, the color corrected signals themselves corresponding to those addresses of B, G and R are accessed so as to be stored in the first register (10). Next, at the second time "1" is added to any one of the high order addresses corresponding to the signal having the largest value among those of b, r and g. In such a case of r g b or r b g, that is, wherein r is the maximum, "1" should be added only to the address of R, and then the color corrected signal of which address R+1, G and B is accessed and stored in the second register (11).

At the third access time "1" is added to two of the high order addresses corresponding to those of the largest and the next larger one, that is, when there is relation of r g b, among those values of r, g and b, a color corrected signal of which address is R+1, G+1, B is addressed, and in case of there being relations of r b g, a color corrected signal having R1, G, B+1 address is accessed and stored in the third register (12). At the fourth access time, to all high order addresses "1" is added, and a color corrected signal of which address is R+1, G+1, B+1 is accessed so as to be stored in the fourth register (13). While the lower order 4 bit signals are entered into the selector (6), and 4 sets of signals such as (1-R; 1-g; 1-b), (r-g; r-b; g-b; g-r; b-r; b-g), (g-b; b-g; b-r; r-b; r-g; g-r) and (b, r, g) are calculated.

According to the signals from the comparator (5), any one of said sets of signals is selected respectively, and picked up as four coefficient signals. In this case since r, g and b are originally 4 bit signals, each of the thus selected four coefficient signals is also 4 bits. However, only when the following relations come out among them, i.e. r=g=b=0, the value of 1-r is equivalent to 10000-r4 $_{bits}$=10000 in binary notation, and becomes a signal of 5 bits.

Each of the coefficient signals is multiplied by each of the color corrected signals stored in each of the registers (10), (11), (12) and (13) with each of the multipliers (14), (15), (16) and (17), and the high order 9 bits or 8 bits of those resultant products are added to each other.

Practically, signals from a detail emphasizing circuit (not shown) is further added to the adder (18). When carrying is performed to the highest significant position in the high order 9 bits of this result (product), signals to be output are limited to signals of 8 bits by setting "1" to all 8 bits of the lower order (=377 in octal notation) with the following circuit. And these results are the color corrected signals which correspond to those addresses R+r, G+g, and B+b.

These results are the color corrected signals which correspond to those addresses R+r, G+g and B+b. In this figure it is shown that for the purpose of changing magnification freely, the color corrected signals obtained by interpolation are once stored in a data memory (not shown), and according to magnification rate access time are adjusted so as to output signals to a D/A converter. However, there is no necessity for changing magnification, the interpolated resultant signals may be directly input to the D/A converter to be output to the interface (not shown) as final analog signals.

What is claimed is:

1. A color scanning apparatus utilizing a linear interpolating method for color signals in a memory comprising:

means for producing color separated signals (B), (R), and (G) by photoelectrically scanning an original picture;

means for converting said color separated signals to those of logarithmic values;

means for converting said logarithmic value signals to digital signals and for separating each of said digital signals into two sets of four bit address signals, one set of which is an address signal for calling color corrected signals of four bits of the higher order (for R, G and B) and the other set of which is for the lower order bits (for r, g and b);

a comparator for comparing the relative magnitudes of said lower four bit address signals and generating an output signal which is a function of said relative magnitudes;

means for monitoring the comparator output signals and determining, as a function of said relative magnitudes, to which address four bit higher order color corrected signals the quantity one is to be added;

memory means for preliminarily storing said color corrected signals corresponding to all combinations of said four bits in the higher order address signals;

means for calculating four sets of coefficients (1-r, 1-g, 1-b), (r-g, r-b, g-b, g-r, b-r, b-g), (g-b, b-g, b-r, r-b, r-g, g-r) and (b, r, g), from the lower order four bit signals and for selecting four coefficient signals from said four sets of coefficients as a function of said comparator output signals;

a plurality of multipliers multiplying each of said coefficient signals by each of the corresponding color corrected signals stored in said memory; and an adder for adding higher order bits obtained by the multiplication of said signals in said multipliers.

2. A color scanning apparatus according to claim 1, wherein said means for converting said color separated signals to those of logarithmic values are logarithmic amplifiers.

3. A color scanning apparatus according to claim 1, wherein said means for taking out said selected signals as four coefficient signals is a coefficient selector.

4. A color scanning apparatus according to claim 1, wherein said converting means are analog-digital converters.

5. A color scanning apparatus according to claim 1, further comprising a further memory connected to the output of said adder through a limiter.

6. A color scanning apparatus according to claim 5, further comprising a digital-analog converter connected to the output of said further memory to generate final analog output signals.

7. A linear interpolating apparatus for color signals in a memory of a picture reproducing machine, comprising means for storing appropriate values of color picture output signals corresponding to certain stepped values of color input signals in a memory addressed in a three-dimensional fashion, and means for interpolating values of color output signals at points which are between said values by:

means for dividing up the cubic interpolation unit of the memory which is constituted by a single step of each of the color input signals into a plurality of tetrahedra whose vertices are either vertices of the cubic unit, centers of its faces, or its center point;

means for calculating the color output signal at each vertex of these tetrahedra which is a center of a face of the cubic unit, if any, by averaging the values of the color output signal at the four vertices which are corners of said face, and at the center point of the cubit unit by averaging the values of the color output signal at all eight of the vertices of the cubic unit;

means for determining which of these tetrahedra includes the interpolation point at which the value of the color output signal is to be interpolated; and determining which deriving the interpolated value of the interpolation point as a weighted sum the values at the four vertices of the determined tetrahedron, the value at each vertex being given a weight corresponding to the ratio of the volume of a second tetrahedron whose vertices are the interpolation point and the other three vertices of the determined tetrahedron to that of the determined tetrahedron.

8. An apparatus as in claim 7, wherein the cubic unit is divided into twenty-four tetrahedra, of each of which one vertex is the center of the cubic unit, two vertices are vertices of the cubic unit which are connected by an edge of the cubic unit, and the fourth vertex is the center of a square face of the cubic unit one edge of which face is the said edge of the cubic unit.

9. An apparatus as in claim 7, wherein the cubic unit is divided into six tetrahedra by three planes which have a line in common, said line being a long diagonal of the cubic unit, and each plane containing two edges and four vertices of the cubic unit.

10. An apparatus as in claim 7, wherein the cubic unit is divided into five tetrahedra by four planes, each of which contains exactly three vertices of the cubic unit, said planes intersecting one another along lines which are diagonals of faces of the cubic unit.

11. A linear interpolating method for color signals in a memory comprising the steps of:

producing color separated signals (B), (R), and (G) by photoelectrically scanning on original picture;

converting said color separated signals to those of logarithmic values;

converting said logarithmic value signals to digital signals and for separating each of said digital signals into two sets of four bit address signals, one set of which is an address signal for calling color corrected signals of four bits of the higher order (for R, G and B) and the other set of which is for the lower order bits (for r, g and b);

comparing the relative magnitudes of said lower four bit address signals and generating an output signal which is a function of said relative magnitudes;

monitoring the output signals and determining, as a function of said relative magnitudes, to which address four bit higher order color corrected signals the quantity one is to be added;

preliminarily storing said color corrected signals corresponding to all combinations of said four bits in the higher order address signals;

calculating four sets of coefficients (1-r, 1-g, 1-b), (r-g, r-b, g-b, g-r, b-r, b-g), (g-b, b-g, b-r, r-b, r-g, g-r) and (b, r, g), from the lower order four bit signals and for selecting four coefficient signals from said four sets of coefficients as a function of said output signals;

multiplying each of said coefficient signals by each of the corresponding color corrected signals stored in said memory; and adding higher order bits obtained by the multiplication of said signals in said multipliers.

* * * * *